US010581888B1

(12) United States Patent
Agranonik et al.

(10) Patent No.: US 10,581,888 B1
(45) Date of Patent: Mar. 3, 2020

(54) CLASSIFYING SOFTWARE SCRIPTS UTILIZING DEEP LEARNING NETWORKS

(71) Applicant: EMC IP Holding Company LLC, Hopkinton, MA (US)

(72) Inventors: Arie Agranonik, Herzelia (IL); Zohar Duchin, Brookline, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 198 days.

(21) Appl. No.: 15/664,925

(22) Filed: Jul. 31, 2017

(51) Int. Cl.
G06F 21/00 (2013.01)
H04L 29/06 (2006.01)
G06N 3/04 (2006.01)
G06N 3/08 (2006.01)

(52) U.S. Cl.
CPC .......... H04L 63/1425 (2013.01); G06N 3/04 (2013.01); G06N 3/08 (2013.01); H04L 63/20 (2013.01)

(58) Field of Classification Search
CPC ....... H04L 63/1425; H04L 63/20; G06N 3/04; G06N 3/08
See application file for complete search history.

(56) References Cited

U.S. PATENT DOCUMENTS

2007/0294179 A1* 12/2007 Krawetz ............... G06F 21/121 705/59
2014/0282003 A1* 9/2014 Gruber .................... G06F 3/167 715/727
2016/0094572 A1* 3/2016 Tyagi ................. H04L 63/1425 726/23
2016/0212153 A1* 7/2016 Livshits ............... H04L 63/145
2016/0283597 A1* 9/2016 Furst ..................... G06F 16/319
2017/0329745 A1* 11/2017 Sharifi .................. G06F 17/212
2018/0075349 A1* 3/2018 Zhao ..................... G06F 21/563
2018/0336460 A1* 11/2018 Tschemezki ............ G06N 3/08
(Continued)

OTHER PUBLICATIONS

Symantec, "The Increased Use of Powershell in Attacks—V1.0," https://www.symantec.com/content/dam/symantec/docs/security-center/white-papers/increased-use-of-powershell-in-aftacks-16-en.pdf, 2016, 37 pages.
(Continued)

Primary Examiner — Shewaye Gelagay
Assistant Examiner — Michael M Lee
(74) Attorney, Agent, or Firm — Ryan, Mason & Lewis, LLP

(57) ABSTRACT

A method includes generating a tokenized representation of a given software script, the tokenized representation comprising two or more tokens representing two or more commands in the given software script. The method also includes mapping the tokens of the tokenized representation to a vector space providing contextual representation of the tokens utilizing an embedding layer of a deep learning network, detecting sequences of the mapped tokens representing sequences of commands associated with designated types of script behavior utilizing at least one hidden layer of the deep learning network, and classifying the given software script based on the detected sequences of the mapped tokens utilizing one or more classification layers of the deep learning network. The method further includes modifying access by a given client device to the given software script responsive to classifying the given software script as a given software script type.

20 Claims, 8 Drawing Sheets

(56) References Cited

U.S. PATENT DOCUMENTS

2019/0036849 A1* 1/2019 Uppala ............. G06F 16/24578

OTHER PUBLICATIONS

T. Mikolov et al., "Distributed Representations of Words and Phrases and Their Compositionality," Proceedings of the 26th International Conference on Neural Information Processing Systems (NIPS), Dec. 5-10, 2013, pp. 3111-3119.

C.N. Dos Santos et al., "Deep Convolutional Neural Networks for Sentiment Analysis of Short Texts," Proceedings of the 25th International Conference on Computational Linguistics: Technical Papers (COLING), Aug. 23-29, 2014, pp. 69-78.

L.M. Rojas-Barahona, "Deep Learning for Sentiment Analysis," Language and Linguistics Compass, Sep. 2016, pp. 701-719, vol. 10, No. 12.

D. Amodei et al., "Deep Speech 2: End-to-End Speech Recognition in English and Mandarin," Proceedings of the 33rd International Conference on Machine Learning (ICML), Jun. 19-24, 2016, pp. 178-182, vol. 48.

Yoon Kim, "Convolutional Neural Networks for Sentence Classification," Proceedings of the Conference on Empirical Methods in Natural Language Processing (EMNLP), Oct. 25-29, 2014, pp. 1746-1751.

Scott Sutherland, "15 Ways to Bypass the PowerShell Execution Policy," https://blog.netspi.com/15-ways-to-bypass-the-powershell-execution-policy/, Sep. 9, 2014, 11 pages.

Y. Lecun et al., "Comparison of Learning Algorithms for Handwritten Digit Recognition," International Conference on Artificial Neural Networks, 1995, pp. 53-60.

G. Hinton et al., "Neural Networks for Machine Learning—Lecture 6a: Overview of Mini-Batch Gradient Descent," http://www.cs.toronoto.edu/~tijmen/csc321/slides/lecture_slides_lec6.pdf, Jun. 2, 2016, 31 pages.

Adeshpande, "A Beginner's Guide to Understanding Convolutional Neural Networks," https://adeshpande3.github.io/adeshpande3.github.io/A-Beginner%27s-Guide-To-Understanding-Convolutional-Neural-Networks/, Jul. 20, 2016, 10 pages.

* cited by examiner

|  | PREDICTED | |
|---|---|---|
| ACTUAL | TP=40 | FN=6 |
|  | FP=0 | TN=507 |

CLASSIFYING SOFTWARE SCRIPTS UTILIZING DEEP LEARNING NETWORKS

FIELD

The field relates generally to information security, and more particularly to detection of security threats in computer networks.

BACKGROUND

Various entities are subject to different types of security threats. Some security threats relate to networking and computer security for client devices used by members of an entity, such as a business, organization or other enterprise. Security threats of this type include malware. Malware can pose a threat to an individual user and that user's devices, as well as possibly threatening an entity associated with the user. Users or members of an entity can become victims of malware-based attacks through a variety of different infection vectors including but not limited to visiting suspicious web sites, connecting machines or devices to untrusted networks, using infected universal serial bus (USB) drives, opening malicious e-mail or other attachments, etc.

SUMMARY

Illustrative embodiments of the present invention provide techniques for the classification of software scripts, including potentially malicious software scripts.

In one embodiment, a method comprises generating a tokenized representation of a given software script, the tokenized representation comprising two or more tokens representing two or more commands in the given software script. The method also comprises mapping the tokens of the tokenized representation to a vector space providing contextual representation of the tokens utilizing an embedding layer of a deep learning network, detecting sequences of the mapped tokens representing sequences of commands associated with designated types of script behavior utilizing at least one hidden layer of the deep learning network, and classifying the given software script based on the detected sequences of the mapped tokens utilizing one or more classification layers of the deep learning network. The method further comprises modifying access by a given client device to the given software script responsive to classifying the given software script as a given software script type. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 5 shows a table illustrating classification results in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
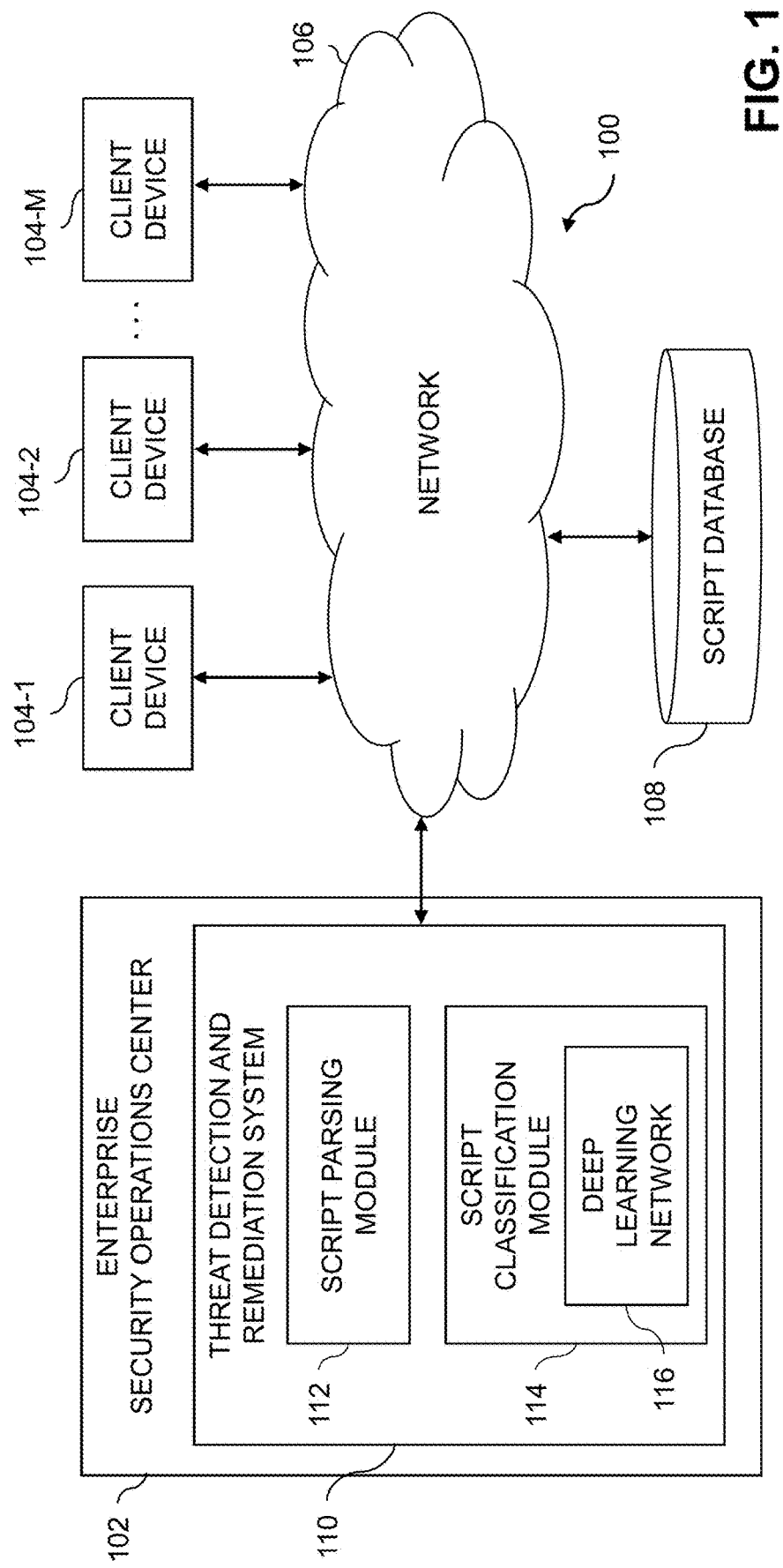
FIG. 1 is a block diagram of an information processing system for classifying software scripts in an illustrative embodiment of the invention.

FIG. 1 shows an information processing system 100 configured in accordance with an illustrative embodiment. The information processing system 100 is assumed to be built on at least one processing platform and provides functionality for classifying software scripts utilizing deep learning networks. Deep learning networks provide deep hierarchical layers of abstraction to detect relationships between code segments, provide algorithms that do not require feature engineering apart from initial preprocessing of scripts, and have the ability to generalize to large amounts of data. As deep learning networks digest more data as the training sample grows, the accuracy of the classification algorithms improves.

In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is a script database 108, which may store information relating to software scripts.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The script database 108, as discussed above, is configured to store and record information relating to software scripts. The script database 108 in some embodiments stores a vocabulary of known script commands for one or more scripting languages. The script database 108 may also store information relating to previously classified software scripts, which may provide training data for training a deep learning network as described in further detail below. The information relating to previously classified software scripts stored in the script database 108 may include blacklists and whitelists of scripts. Blacklisted scripts represent known malicious or potentially malicious software scripts, while whitelisted scripts represent benign software scripts. In some cases, the script database 108 may also store additional lists of different script types, such as a graylist of scripts representing adware.

The script database 108 in some embodiments is implemented using one or more storage devices associated with the enterprise SOC 102. Such storage devices may comprise, for example, storage products such as VNX® and Symmetrix VMAX® storage arrays, software-defined storage products such as ScaleIO™ and ViPR®, flash-based storage arrays, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 110 of the enterprise SOC 102 are provided over network 106 to client devices 104, or to a system administrator, information technology (IT) manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 110. For example, a given security or host agent may comprise a mobile telephone equipped with a mobile application configured to receive alerts from the enterprise SOC 102 or the threat detection and remediation system 110 and to provide an interface for the security agent to select particular remedial measures for responding to the alert or notification. Examples of such remedial measures may include blocking access to one or more scripts, removing scripts from one or more of the client devices 104, requiring scripts to be run in a sandboxed or other protected environment on one or more of the client devices 104, requiring user input or authentication to obtain or run one or more scripts, triggering further review of scripts classified as a designated type (e.g., classified as malware), etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 110. As will be described in further detail below, the threat detection and remediation system 110 is configured to classify software scripts in various use case scenarios.

In some embodiments, the threat detection and remediation system 110 provides a script analysis service for users of the client devices 104. A user of one of the client devices 104 can send a script to the threat detection and remediation system 110, which will analyze the script using the deep learning models described herein to determine if the script is malicious or has some other defined characteristic.

The threat detection and remediation system 110 may also provide a network or log monitoring tool, which looks for scripts in network traffic of the network 106 from client devices 104. Such scripts may be analyzed using the deep learning models described herein for classification. As described in further detail below, if a script is determined to be malicious various remedial actions may be taken such as stripping out the script from a memory of one or more of the client devices 104.

The threat detection and remediation system 110 may also be implemented as an endpoint monitoring tool to look for scripts in the file system or memory of one or more of the client devices 104. Such functionality, in some embodiments, may be implemented via a user or security agent on one or more of the client devices 104. The endpoint monitoring tool may also provide a pre-execution check, where scripts are checked for maliciousness before the scripts are run.

In some embodiments, the threat detection and remediation system 110 is implemented as an email tool, configured to extract scripts in the body of or attachments of emails, and to analyze them utilizing the deep learning models described herein. Malicious or potentially malicious scripts may be removed or flagged.

It is to be noted that the use cases described above are presented by way of example only, and that embodiments are not limited to these specific use cases.

Although shown as an element of the enterprise SOC 102 in this embodiment, the threat detection and remediation system 110 in other embodiments can be implemented at least in part externally to the enterprise SOC 102, for example, as a stand-alone server, set of servers or other type of system coupled to the network 106. In some embodiments, the threat detection and remediation system 110 may be implemented at least in part within one or more of the client devices 104.

The threat detection and remediation system 110 in the FIG. 1 embodiment is assumed to be implemented using at least one processing device. Each such processing device generally comprises at least one processor and an associated memory, and implements one or more functional modules for controlling certain features of the threat detection and remediation system 110. In the FIG. 1 embodiment, the threat detection and remediation system 110 comprises a script parsing module 112 and a script classification module 114 implementing a deep learning network 116.

The script parsing module 112 is configured to generate a tokenized representation of a given software script, where the tokenized representation comprises a plurality of tokens representing the commands or other strings in the given software script.

The script classification module 114 is configured to classify the given software script utilizing the deep learning network 116. An embedding layer of the deep learning network 116 is used to map the tokens of the tokenized representation of the given software script to a vector space providing contextual representation of the tokens. At least one hidden layer of the deep learning network 116 is used to detect sequences of the mapped tokens representing sequences of commands associated with designated types of script behavior. One or more classification layers of the deep learning network 116 are used to classify the given software script based on the detected sequences of the mapped tokens.

The script classification module 114 is further configured to modify access by one or more of the client devices 104 to the given software script responsive to classifying the tokenized representation of the given software script as a given software script type, such as classifying the tokenized representation of the given software script as containing malicious code or otherwise representing malware.

Additional details regarding the script parsing module 112 and the script classification module 114 will be described in further detail below with respect to FIGS. 2-6.

It is to be appreciated that the particular arrangement of the enterprise SOC 102, threat detection and remediation system 110, script parsing module 112 and script classification module 114 illustrated in the FIG. 1 embodiment is presented by way of example only, and alternative arrangements can be used in other embodiments. As discussed above, for example, the enterprise SOC 102, threat detection and remediation system 110, script parsing module 112 and/or script classification module 114 may in some embodiments be implemented internal to one or more of the client devices 104. As another example, the functionality associated with the script parsing module 112 and the script classification module 114 may be combined into one module, or separated across more than two modules with the multiple modules possibly being implemented with multiple distinct processors or processing devices.

At least portions of the script parsing module 112 and the script classification module 114 may be implemented at least in part in the form of software that is stored in memory and executed by a processor.

It is to be understood that the particular set of elements shown in FIG. 1 for classification of software scripts is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 110 may be implemented external to enterprise SOC 102, such that the enterprise SOC 102 can be eliminated.

In some embodiments, the threat detection and remediation system 110 may be part of or otherwise associated with a system other than the enterprise SOC 102, such as, for example, a critical incident response center (CIRC), a security analytics system, a security information and event management (STEM) system, etc.

The threat detection and remediation system 110 and other portions of the system 100, as will be described in further detail below, may be implemented at least in part using one or more processing platforms including public or private cloud infrastructure, or other distributed virtual infrastructure.

Figure 2:
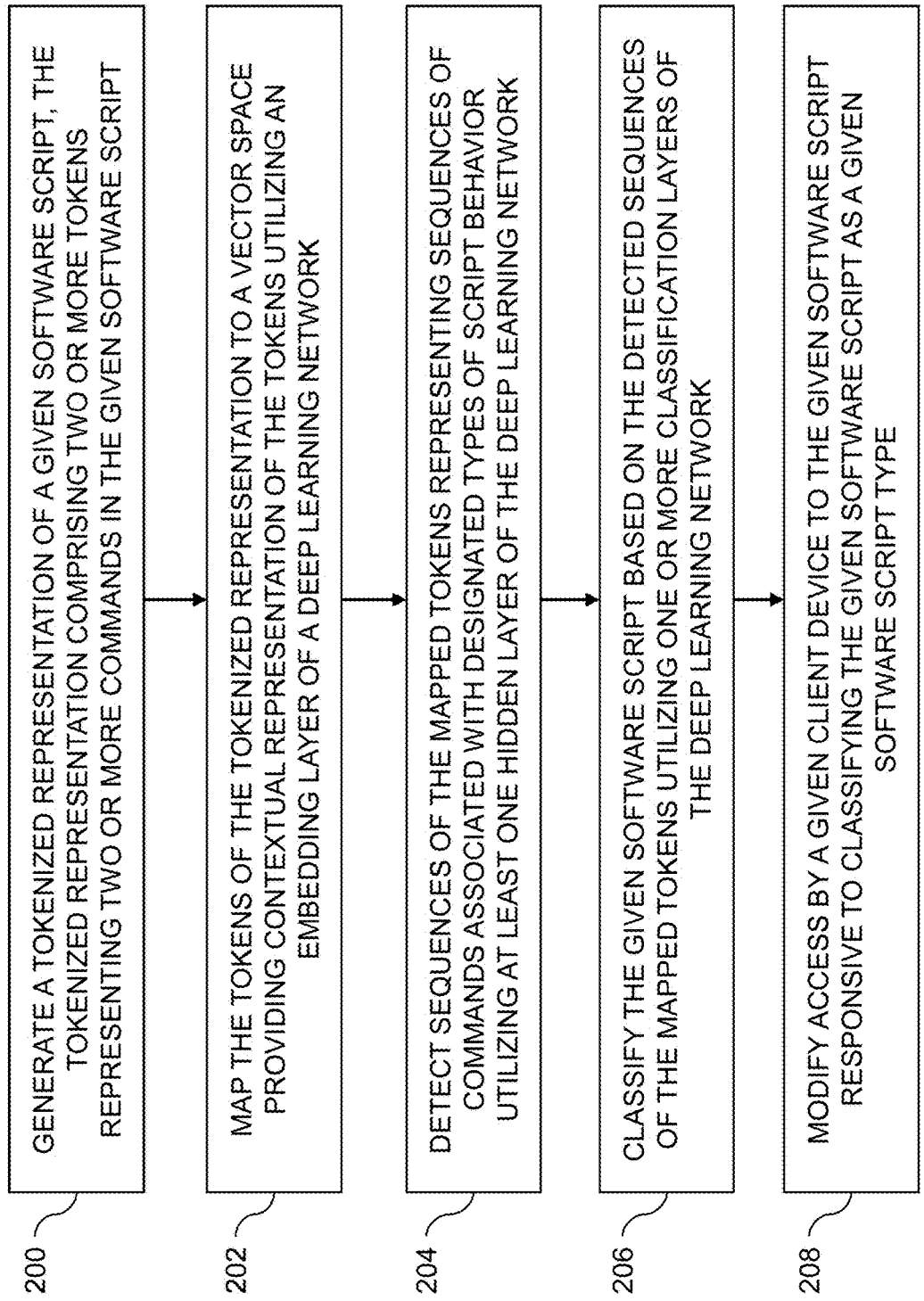
FIG. 2 is a flow diagram of an exemplary process for classification of software scripts in an illustrative embodiment.

An exemplary process for classification of software scripts will now be described in more detail with reference to the flow diagram of FIG. 2. It is to be understood that this particular process is only an example, and that additional or alternative processes for classification of software scripts can be carried out in other embodiments.

In this embodiment, the process includes steps 200 through 208. These steps are assumed to be performed by the threat detection and remediation system 110 utilizing the script parsing module 112 and the script classification module 114. The process begins with step 200, generating a tokenized representation of a given software script. The tokenized representation comprises a plurality of tokens representing different strings in the given software script, such as tokens representing commands in the given software script.

Generating the tokenized representation in step 200 may include tokenizing the given software script into a plurality of tokens based on delimiters of a scripting language utilized by the given software script. Such delimiters may include, by way of example, spaces, tabs, semicolons, etc. A vocabulary or corpus of scripting commands of the scripting language utilized by the given software script may be created, where each command is associated with an index, such that strings in the given software script (e.g., the tokens) may be represented by index values in the vocabulary. Tokens which do not correspond to any of the index values in the vocabulary may be assigned a designated value, such as 0. An array representing the given script file is generated using the index values for the tokens in the vocabulary.

The tokenized representation generated in step 200, in some cases, may result in a sparse representation. The sparse representation may be converted into a dense representation to improve classification performance. Several techniques may be used for converting to a dense representation. In some embodiments, one or more tokens in the array which have the designated value (e.g., unknown tokens) between a first token and a second token that are represented by index values in the vocabulary (e.g., known tokens) may be removed. For each unknown token that is removed, an instance of the designated value may be may be padded before the first token or after the second token.

In other embodiments, a sequence of two or more unknown tokens having the designated value are identified between a first known token and a second known token each represented by an index value in the vocabulary. One or more of the unknown tokens having the designated value between first known token and the second known token are removed while leaving at least one unknown token having the designated value between the first known token and the second known token. The tokenized representation is then padded with an instance of the designated value for each removed unknown token before the first known token or after the second known token. In other embodiments, known tokens that are represented by index values in the vocabulary are moved to one side of the array (e.g., the beginning or the end) while unknown tokens represented by the designated value are moved to the other side of the array.

The process continues with step 202, mapping the tokens of the tokenized representation of the given software script to a vector space providing contextual representation of the tokens utilizing an embedding layer of a deep learning network. The vector space may be a continuous vector space. The embedding layer is configured to map the tokens to the vector space such that a distance between a first vector value of a first token representing a first command and a second vector value of a second token representing a second command is based on a similarity of the first command and the second command. In other words, tokens having similar meanings (e.g., similar commands) should be close in the vector space.

In step 204, sequences of the mapped tokens representing sequences of commands associated with designated types of script behavior are detected utilizing at least one hidden layer of the deep learning network. In some embodiments, the at least one hidden layer comprises a sequence of two or more hidden layers. Each hidden layer may comprise a convolutional layer, such as a one-dimensional (1D) convolutional layer. The convolutional layer includes two or more convolution filters configured to activate in response to detecting a feature in the given script file. The convolutional layer may apply Rectified Linear Units (ReLU) activation functions to its output. In some embodiments, a hidden layer may further include a dropout layer configured to drop out random sets of activations in the convolutional layer. The hidden layer may also include a pooling layer configured to provide non-linear down-sampling of the output of the convolutional layer.

The given software script is classified in step 206 based on the detected sequences of the mapped tokens utilizing one or more classification layers of the deep learning network. The one or more classification layers may comprise a fully connected layer comprising neurons with connections to all activations in the at least one hidden layer, and an output layer comprising at least one neuron that generates a representation of a confidence level of the deep neural network in classifying the given software script as the given software script type. In some embodiments the output layer may include two or more neurons, where each neuron outputs a respective confidence level of the deep learning network as classifying the given software script as a corresponding software script type.

The process concludes with step 208, modifying access by a given client device to the given software script responsive to classifying the tokenized representation of the given software script as a given software script type. The given software script type may represent malicious software scripts, prompting various remedial actions, including at least one of removing the given software script from a memory or storage of the given client device, preventing the given client device from obtaining the given software script and causing the given software script to be opened in a sandboxed application environment on the given client device.

Illustrative embodiments will now be described herein with respect to the classification of PowerShell scripts. It is to be appreciated, however, that the techniques described herein may be applicable for various other programming languages, and that the use of PowerShell in certain embodiments described herein is presented by way of example only.

In the last few years, PowerShell attacks have become more frequent. PowerShell is a framework by Microsoft® for task automation and configuration management. PowerShell includes a command-line shell with a scripting language built on the .NET Framework and .NET Core. The PowerShell scripting language was created to help system administrators perform tasks in a more efficient and programmatic way, similar to Unix based systems. The PowerShell scripting language is destined to replace the command line in Microsoft® Windows systems completely in the future, and is more powerful than the DOS command line. PowerShell allows for access to all Windows operating system (OS) primitives, including the registry, .NET application programming interfaces (APIs), WIN32 APIs, network and disk.

As a result of PowerShell's abilities, attackers have begun utilizing the PowerShell scripting language in attack vectors. The appeal of using PowerShell, to an attacker, lies in the fact that PowerShell is already installed on Windows machines by default since 2007. Some attack methodologies using PowerShell are referred to as "living off the land" where the attacker uses only tools that are available to administrators and that leave no footprint on the target machine. This includes execution of code from memory without touching the disk, and attaching malicious code to existing dynamic link libraries (DLLs) in memory to avoid opening new processes.

Attackers may use PowerShell in various different attack vectors. PowerShell may be used inside Office documents with Macros. PowerShell may also be used as part of a lateral movement attack, where an attacker wishes to execute code inside a remote host during the network expansion phase. PowerShell may also be used for covert execution of malicious code. Since PowerShell is able to execute code from memory, attackers can download more malicious PowerShell code and execute such code on-the-fly.

Some embodiments provide efficient methods for differentiating between malicious and benign PowerShell code, or more generally script code, using a Convolutional Neural Network (CNN) and a vector representation of programming language code based on Natural Language Processing (NLP). A CNN is an example of a deep learning network. PowerShell code is converted into a token-based representation, and embeddings are used to describe each token. Embedding provides for mapping words or phrases from a vocabulary to vectors of real numbers. A neural network is created with 1D convolution, embedding and a dense layers. As will be described in further detail below with respect to FIGS. 5 and 6, techniques described herein provide good results on test data comprising PowerShell scripts. While certain embodiments are described herein with respect to PowerShell scripts, the techniques described herein may be applied to various other programming languages, where the cost function is used to distinguish higher-level activity or intent of the script.

In some embodiments, detectors use deep learning to identify malicious scripts or code, such as malicious PowerShell scripts. A CNN with 1D convolutions and an embedding layer is used to represent each script. NLP and sentiment analysis may be used, from a different domain of programming language analysis, for malware detection.

Programming languages are a form of restricted natural language, and as such can be treated with an NLP approach and associated tools. Advantages of using a Deep Neural Network (DNN) such as a CNN within this context include that deep networks have more degrees of freedom relative to shallow models, and thus can learn to generalize better. Deep networks also have the ability to ingest more data, improving performance of a classifier as the data set becomes larger. In addition, state of the art results in sentiment analysis tasks related to NLP may be leveraged.

Provided below is a description of how to parse and represent a script, such as a PowerShell script, to represent the script in a way that can be fed into a DNN. In some embodiments, tokenization and an embedding layer are used to parse and represent scripts. Next, the architecture of a neural network used for classifying scripts is described. Preliminary results obtained by running an example neural network are then described, based on a small data set containing several thousand examples of scripts.

PowerShell script files (e.g., .psl files) are treated as natural language documents. Such script files are first tokenized into tokens separated by known PowerShell delimiters, such as spaces, semicolons, tabs, etc. A corpus of language tokens is also created. The corpus may be created by extracting cmdlets names from PowerShell Help, and by looking into the .NET API for known commands that are mostly used by malicious actors. A cmdlet refers to a lightweight command used by PowerShell, which may be invoked within the context of a PowerShell script.

After obtaining a tokenized representation of a script file and a corpus of PowerShell commands, an array is created which represents the script file using the indexes of the tokens as they appear in the corpus. An example script file representation at this stage may look like:

[0, 0, 0, . . . 124, 0, . . . , 145, 34, 0, 0, 0 . . . ]

Each token that is not identified according to the corpus is assigned the index 0 as an "unknown" token. At this stage, the script file representation might be very sparse as a result of many unknown tokens such as variable names and language constructs that are not familiar. Depending on the initial vocabulary, as well as the coverage of language constructs, the resulting representation could be sparse or dense.

In the case of a sparse representation, such as many zeros between commands, the representation may be compressed in order to address the sequence of commands more clearly and to let the learning algorithm decipher the intent of the program in the script file. Various methods may be used to compress a sparse representation.

In some embodiments, zeros that appear in the middle of the representation in between commands are deleted. For example, a script file represented as:

[0, 0, 0, 12, 0, 0, 34, 0, 0]

may be converted into a dense representation:

[0, 0, 0, 12, 34, 0, 0, 0, 0].

In this technique, the right or left side of the input is padded with zeros to maintain a same window size.

In other embodiments, one zero may be left in the place of many zeros in a representation, to maintain the ability of the algorithm to learn the sequence of commands while also showing that there was unknown commands in the middle of the sequence. For example, a script file represented as:

[0, 0, 0, 12, 23, 0, 0, 0, 0, 44, 0]

may be converted into the representation:

[0, 0, 0, 12, 23, 0, 44, 0, 0, 0, 0].

In some embodiments, all zeros in between commands are deleted, but all commands are moved to one side while the other is padded with zeros. This will give the algorithm the ability to disregard the zeros and solely focus on commands. For example, the representation:

[0, 0, 0, 12, 23, 0, 0, 0, 0, 44, 0]

may be converted into the representation:

[0, 0, 0, 0, 0, 0, 0, 0, 12, 23, 44]

Each of the above-described techniques provides a valid representation of the script file. For testing described below, the last approach of moving all commands to one side and padding the other with zeros was utilized.

Once a dense language representation of the script file is obtained, an embedding conversion to a 32-bit vector is performed for each token. Embeddings provide powerful representations that are used by NLP tasks in DNNs. The power of embeddings lies in the ability to capture the contextual meaning of each token as it is surrounded by other tokens in the language. For example, since there are multiple commands to achieve Write-File, the embedding layer will learn a vector representation of this command and will correlate this command to a similar Write-File2 command (e.g., another version of the Write-File command that exists in the scripting language). This allows the inference algorithm to generalize better given a new test set. This ability is important in script classification, since it is desired to capture similar commands like writing to a file, or downloading strings or files from a network. The embedding layer, as will be described in further detail below with respect to FIG. 3, is the first layer of the CNN used in some embodiments.

In the next step, the embedded representation of the script code is fed into a DNN. The architecture of the DNN may vary taking into account available computation power, the complexity of the scripting language and other factors. Some embodiments use the architecture shown in FIG. 3. The machine learning algorithm described is separated into four parts to achieve inference of maliciousness or other classification.

Figure 3:
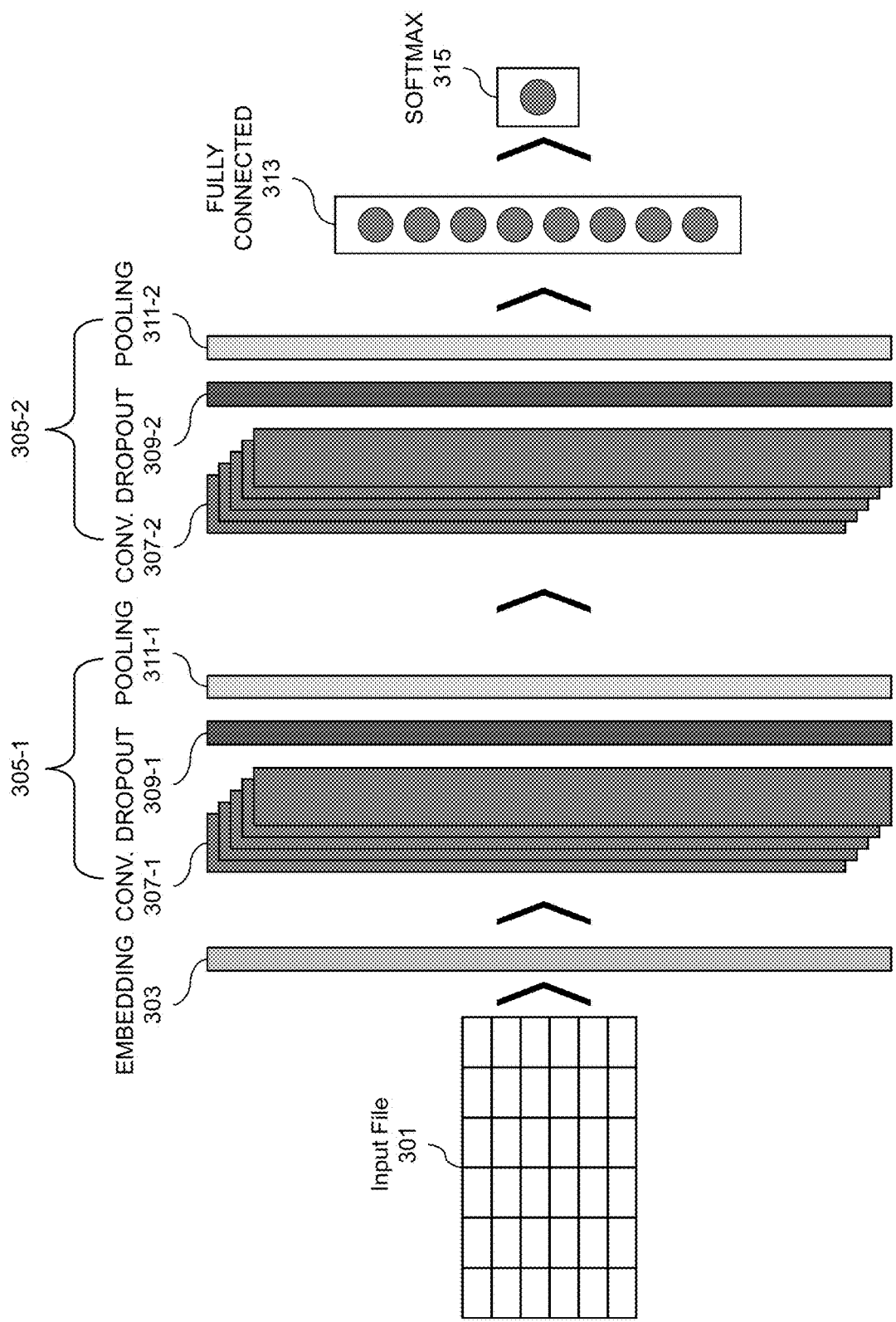
FIG. 3 shows an example architecture for a deep learning network in an illustrative embodiment.

As shown in FIG. 3, an input script file 301 is parsed and converted into indexed tokenized form as described above, providing for a dense representation of the script file. The dense representation is fed into embedding layer 303, which provides for contextual representation of each token such that similar "meaning" tokens will have vectors that are close to each other using Euclidean distance. The embedding layer 303, in some embodiments, embeds tokens into a continuous vector space. The continuous vector space provides a distributed representation of the token vocabulary. During training, the CNN learns an embedding map such that similar tokens (e.g., tokens representing similar commands in the scripting language) are mapped to similar regions in the continuous vector space. While not explicitly shown in FIG. 3, the embedding layer 303 may be associated with a dropout layer.

The CNN architecture of FIG. 3 includes two blocks 305-1 and 305-2 (collectively blocks 305), each including a 1D convolutional layer (307-1 and 307-2, respectively, collectively 1D convolutional layers 307 or convolutional layers 307), a dropout layer (309-1 and 309-2 respectively, collectively dropout layers 309) and a pooling layer (311-1 and 311-2 respectively, collectively pooling layers 311).

The convolutional layers 307 each apply a specified number of convolution filters to the input file. The CNN learns filters that activate when the network detects a specific type of feature in the input file. In some embodiments, the convolutional layers 307 apply ReLU activation functions to the output to introduce nonlinearities.

The dropout layers 309 "drop out" random sets of activations in the convolutional layers 307 by setting them to zero. The dropout layers alleviate the problem of overfitting, where weights in the network are tuned to the training data to an extent that its performance is reduced when given new data.

The pooling layers 311 provide for non-linear downsampling. Various non-linear functions may be utilized in the pooling layers 311. In some embodiments, the maxpooling function is used, which partitions the input into sub-regions, and outputs the maximum for each sub-region. The pooling layers progressively reduce the size of the representation of the input, reducing the number of parameters and computation.

The 1D convolutional layers 307, dropout layers 309 and pooling layers 311 form blocks 305 that represent the relationships between individual tokens in a feature set according to the number of filters in the layers. While two blocks 305 are shown in the FIG. 3 architecture, embodiments are not so limited. Depending on the input size and the amount of data, as well as computation constraints, different numbers of blocks 305 may be used. For example, 1-10 blocks 305 may be used. In the test results discussed below, 1-2 convolutional layers 307 were used. The use of convolutional layers 307 reduces the number of parameters of the network.

Once the data is preprocessed into feature sets using the convolutional layers 307 in blocks 305, the features are passed to a fully connected layer 313. The fully connected layer 313 is used in neural networks that act as classifiers, and has neurons with connections to all activations in the block 305-2. The last layer in the FIG. 3 architecture is a softmax layer 315 which provides the classification algorithm, accepting features from previous layers after they have been preprocessed using convolutions, and outputs to one softmax neuron that does the prediction. The network outputs a number between 0 and 1, which represents the confidence level of the CNN given the input script file 301 to be malicious, where 1 is malware and 0 is benign.

Figure 4:
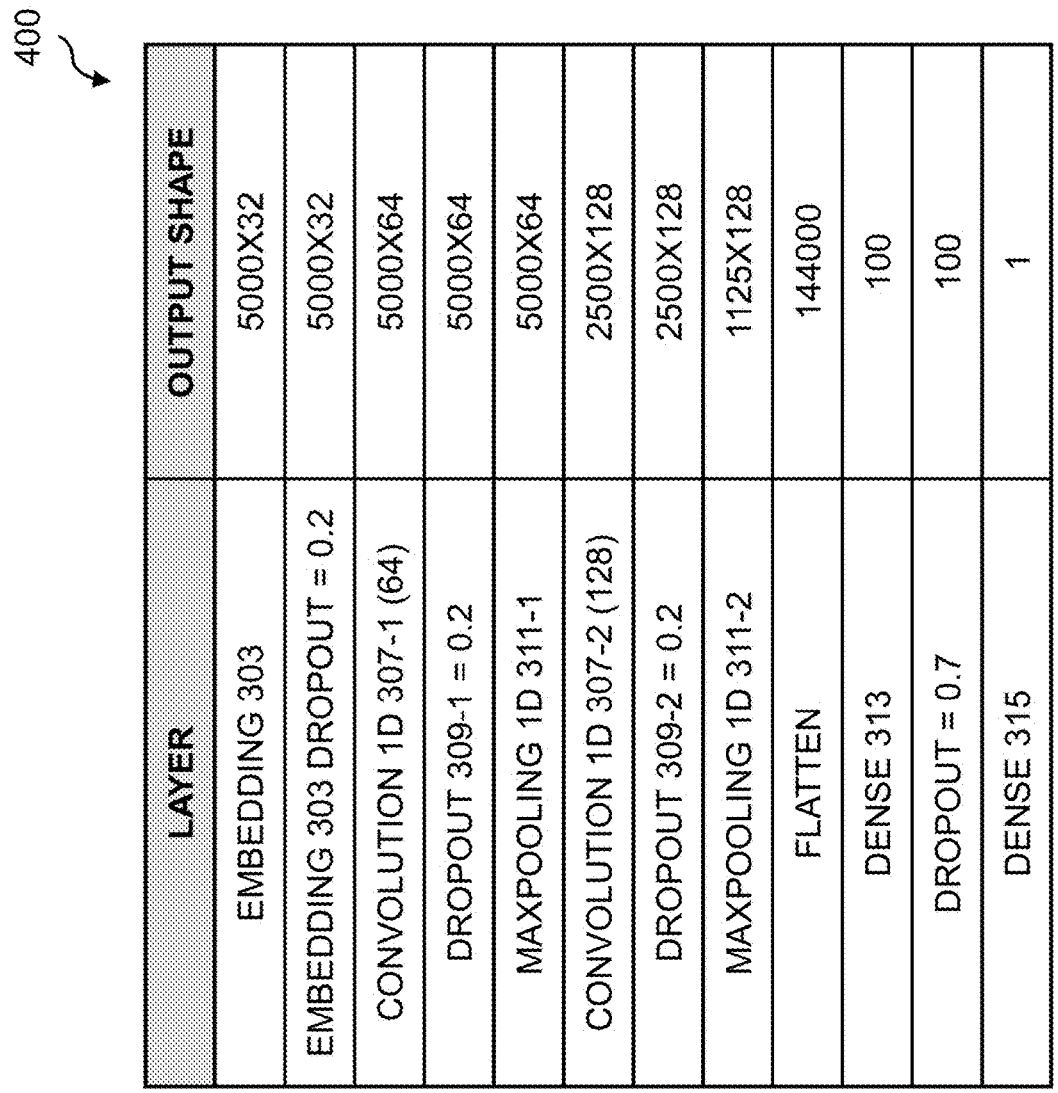
FIG. 4 shows an example of configuration parameters for the deep learning network of FIG. 3 in an illustrative embodiment.

FIG. 4 shows a table 400 of parameters that may be used in the FIG. 3 architecture. The table 400 shows the layers of the FIG. 3 architecture and the output shape or tensor (e.g., the n-dimensional array) that is passed from layer to layer. The embedding layer 303, for example, passes a 5000×32 output tensor to the next layer. The table 400 includes the output shape for a number of layers not explicitly shown in the FIG. 3 architecture, such as a dropout layer associated with the embedding layer 303. This dropout layer has a parameter of 0.2 controlling an amount of activations to drop out in embedding layer 303. As another example, the table 400 includes the output shape of the flatten layer, having 144,000 neurons which are transmitted to each of the 100 neurons of the fully connected layer 313, also referred to as dense layer 313. The flatten layer converts the output of the last block (e.g., 305-2) into a feature vector to be used by the dense layer 313.

The benefit of the 1D convolution layers 307 lies in sequence detection capabilities. For analyzing script files such as PowerShell script files, it allows for detection of a sequence or sequences of commands that might represent malicious behavior. By using the two 1D convolution layers 307-1 and 307-2 (with 64 and 128 filters, respectively), the receptive field of the network is increased to case a wider net on large sequences of commands and their context.

As an example, a sequence of commands may be represented as:

[*, *, *, DownloadString, *, *, Write-File, *, *, *].

This pattern may have many commands in between the "DownloadString" and "Write-File" commands, but cases where these two commands appear in succession might be of interest, such as indicating maliciousness. The successive convolutional layers 307 with larger receptive fields are in a good position to catch this behavior.

In some embodiments, the CNN architecture may be trained with stochastic gradient descent (SGD). An optimizer may be used to adjust the learning rate. To gain optimal accuracy on the test data, 15 epochs were used. The exact training methodology and hyper parameters, however, may vary as desired. Some possible variations are discussed below.

Although SGD is often the best method for training a neural network, various other mechanisms may be utilized such as evolutionary techniques, the Newton method, Levenberg-Marquadt algorithm, etc.

Many optimizers may be used for neural network training. Examples of optimizers include RMSProp, Eve, Adam, adagrad, etc. Different optimizers have pros and cons, which may be considered in selecting the optimizer for a particular dataset. The optimization of the algorithm allows for efficient conversion and has an effect on the learning rate. In many optimizers, the learning rate is constant. The learning rate is defined beforehand to adjust for faster convergence. Early stopping may be used to stop the network learning before it over fits the training data.

The numbers of filters used in the convolutional layers 307 has a direct effect on the number of feature sets that the network can process. The choice of filters may be based on factors such as the input size, the number of layers, computation required, etc. For the test data, 64 and 128 filters were used in the convolutional layers 307-1 and 307-2, respectively, based on the input size and number of layers. The number of computation steps was also taken into account so that training took a relatively short period of time.

The number of neurons in each layer, and in the fully connected layer 313, is a choice dictated by the size of the input (for the test data, 5000×32 as shown in table 400 of FIG. 4) and the computational power of the learning system. As testing was done on a single machine, the parameters were adjusted for fast learning. When using many resources with distributed learning, such as using cloud infrastructure or other processing platforms described herein, the number of neurons may be increased.

The test data included random samples of PowerShell scripts downloaded from GitHub and TechNet. The overall size of the benign data set was 2500 samples. In addition, 205 malicious script files were obtained. The training data set includes 2,152 scripts, of which 1,993 were whitelisted or represented benign scripts (92%) and 159 were blacklisted or represented malicious scripts (8%). The test data included 507 whitelisted scripts (91%) and 46 blacklisted scripts (9%). The training and test data split was 86% and 14%, respectively.

Figure 5:
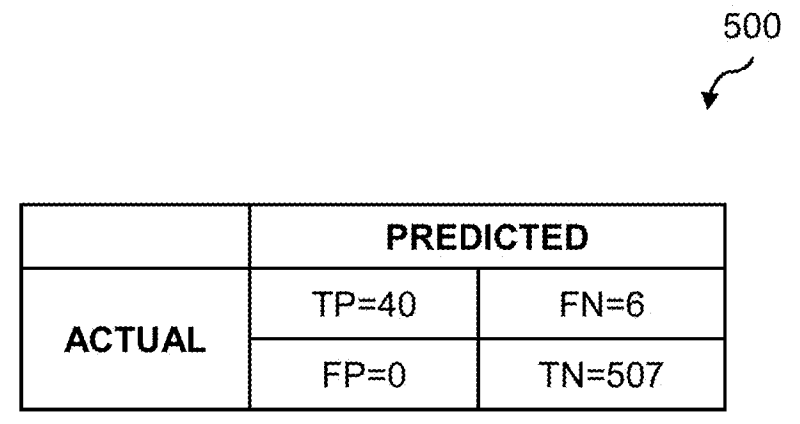

The test data was classified using the FIG. 3 CNN architecture, utilizing the parameters shown in table 400 of FIG. 4. The confusion matrix 500 shown in FIG. 5 presents the results obtained using the test data. The confusion matrix 500 corresponds to an F1 score of 0.93, which is very good considering the small test set scenario. In the confusion matrix 500, TP represents true positives, FP represents false positives, TN represents true negatives and FN represents false negatives.

Figure 6:
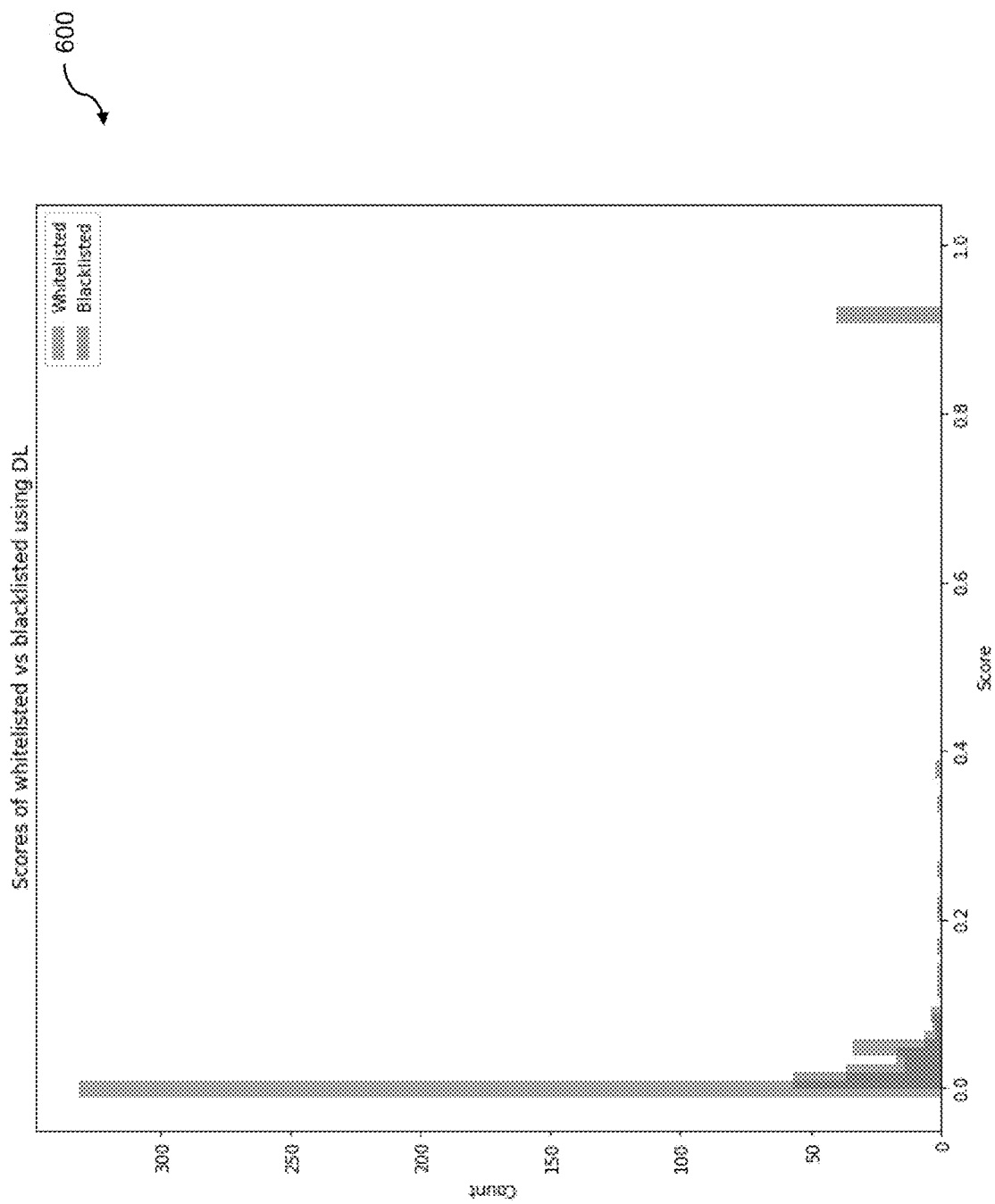
FIG. 6 shows a plot illustrating classification results in an illustrative embodiment.

In addition to the confusion matrix 500, it is helpful to determine the separation capability of the network by looking at the produced score of the classifier (between 0 and 1). The goal is to learn how well the network is able to separate between benign and malicious samples, by generating a low score for benign scripts and a high score for malware scripts. FIG. 6 shows a plot 600 of the scoring table for the test data. The x-axis is the score, with the y-axis being the count of examples. As shown in the plot 600, there is good separation with very few examples in the middle between the low and high end of the scores. Thus, there is high quality separation capability. The test data included a small number of blacklisted scripts. With the addition of more blacklisted scripts to balance the dataset, false negatives will decrease.

Various techniques may be used for detection of malicious scripts, such as PowerShell scripts, including signature-based detection and machine learning approaches using "bag-of-words" modeling and shallow detectors.

In signature-based approaches, such as YARA, regular expressions, hashes, etc., the signature is capable of detecting a strict succession of malicious commands or tags (e.g., "-w hidden" or "-noni"). Such approaches, however, suffer from many of the disadvantages as traditional signature-based detection that anti-virus programs exhibit, in that each signature can be bypassed by using a variable approach to dynamic commands. For example, sections of commands may be stored in strings, with the strings being combined during run-time and concatenated. Reflection may also be used.

In some machine learning approaches, feature sets are applied to the script code. Example features for PowerShell scripts include malicious keywords such as "-w hidden" or by passing a parameter such as "-noprofile." There are also many ways to disable execution policy of a script. Such approaches have limitations. Shallow models, for example, have a limit of training data and generalization capability. Deep learning networks used in some embodiments perform better by definition as more data is added. Feature engineering is also hard, and may not catch the full scope of malware in shallow models. A human engineered feature for writing to a file in PowerShell, for example, is the appearance of the command "Write-File." A malicious actor can bypass detection of this feature by using a new command. In deep learning networks used in some embodiments, the commands are not feature engineered. Instead, a full language dictionary is used and the algorithm chooses the important features using the neural network.

In addition to the above-noted advantages relative to techniques such as signature-based detection and shallow machine learning, the deep learning networks used in some embodiments provide various additional advantages. Sequence representation as a language model allows for representing script code as a NLP task, using embeddings to capture context. This approach has proven meaningful for the NLP task and is of great value in script identification. The deep model also allows for increase of data and accuracy. In deep models, more data can significantly increase the generalization ability of the network due to the ability of the model to have many more degrees of freedom via the parameters. The long sequence memory also allows the deep learning models to remember much longer sequences of malicious intent in the scripts, via the stack of 1D convolutions that have a large receptive field. In addition, feature engineering is not required.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
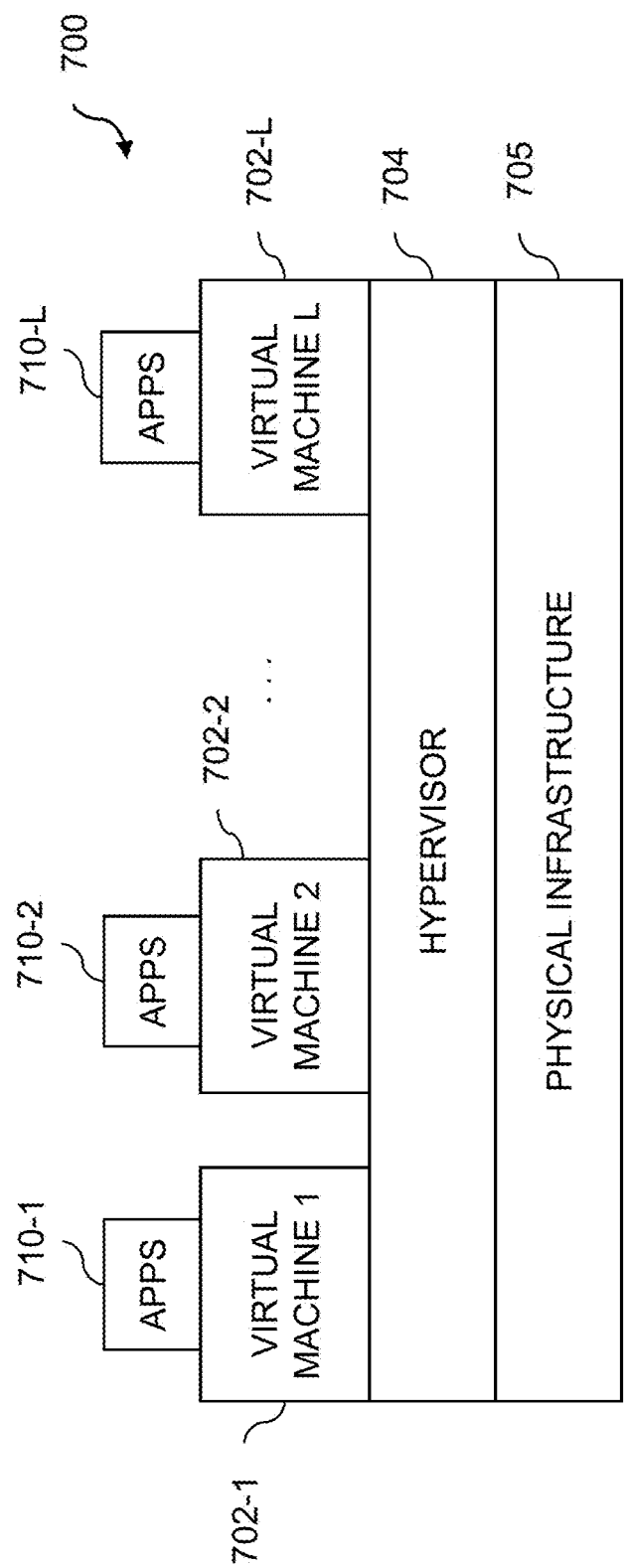
FIGS. 7 and 8 show examples of processing platforms that may be utilized to implement at least a portion of the FIG. 1 system.
Figure 8:
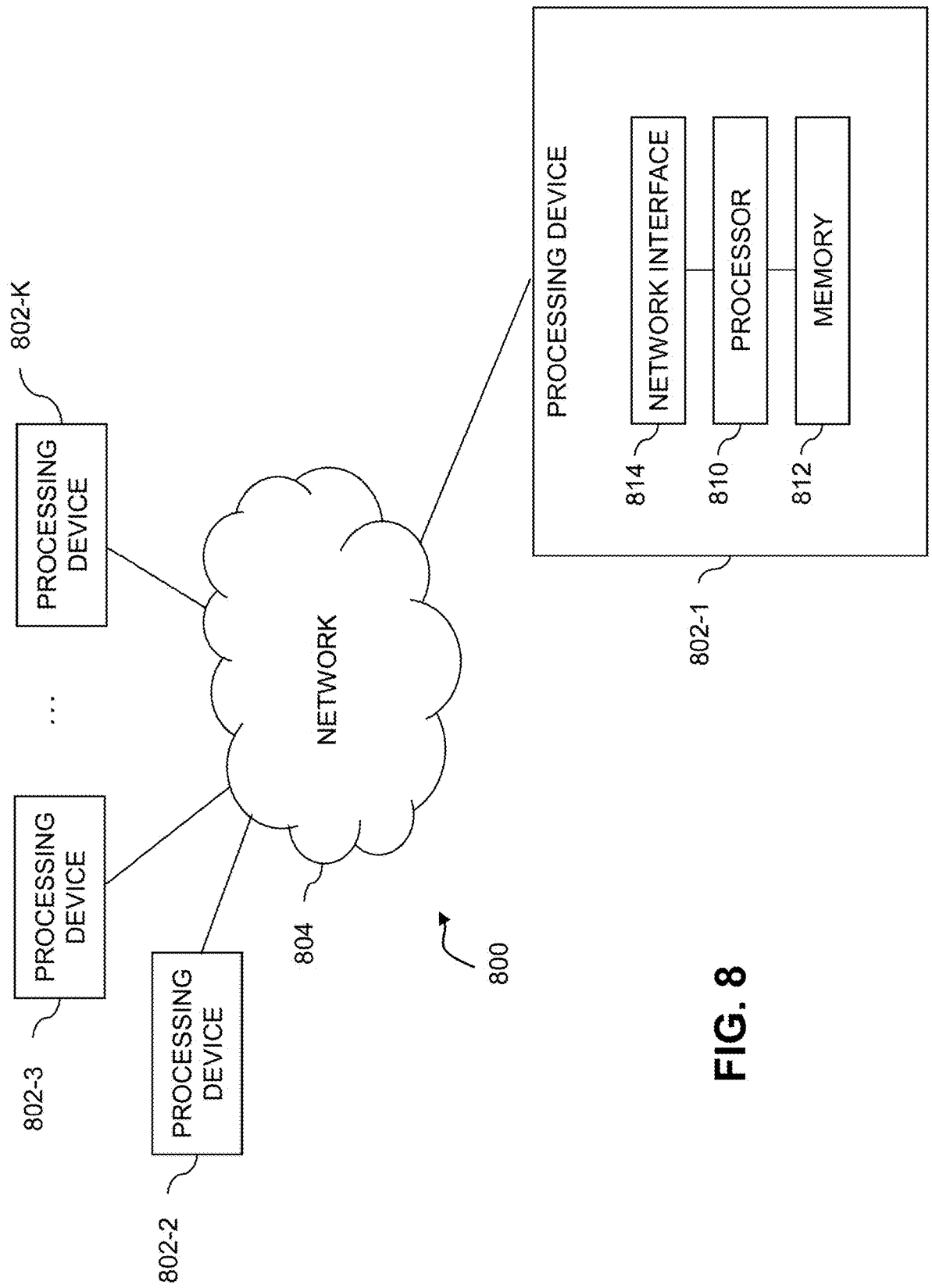

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

These and numerous other alternative cloud computing environments or other types of processing platforms can be configured to implement classification functionality as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality described herein for classifying software scripts are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide the classification functionality described herein. Also, the particular configurations of system and device elements shown in the figures can be varied in other embodiments. Thus, for example, the particular type of software modules deployed in a given embodiment and their respective configurations may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
   generating a tokenized representation of a given software script, the tokenized representation comprising two or more tokens representing two or more commands in the given software script;
   mapping the tokens of the tokenized representation to a vector space providing contextual representation of the tokens utilizing an embedding layer of a deep learning network;
   detecting sequences of the mapped tokens representing sequences of commands associated with designated types of script behavior utilizing at least one hidden layer of the deep learning network;
   classifying the given software script based on the detected sequences of the mapped tokens utilizing one or more classification layers of the deep learning network; and
   modifying access by a given client device to the given software script responsive to classifying the given software script as a given software script type;
   wherein generating the tokenized representation comprises:
      generating an array comprising a set of ordered token values corresponding to an order of the tokens in the given software script, wherein a given one of the token values comprises either (i) an index value representing a known script command in a vocabulary of known script commands of a scripting language utilized by the given software script or (ii) a designated value representing an unknown script command not in the vocabulary of known script commands;
      determining whether the array comprises a representation of a first type, the representation of the first type comprising at least a threshold number of consecutive instances of the designated value representing unknown script commands between a first token of the array comprising a first index value representing one of the known script commands and a second token of the array comprising a second index value representing one of the known script commands; and
      responsive to determining that the array comprises the representation of the first type, converting the representation of the first type to a representing of a second type different than the first type by altering at least one of an ordering and a number of token values in the array having the designated value representing unknown script commands such that there is less than the threshold number of consecutive instances of the designated value representing unknown script commands between the first token and the second token;
   wherein the method is performed by at least one processing device comprising a processor coupled to a memory.

2. The method of claim 1 wherein generating the tokenized representation of the given software script comprises tokenizing the given software script into the two or more tokens based on delimiters of a scripting language utilized by the given software script.

3. The method of claim 1 wherein converting the representation of the first type to the representation of the second type comprises:
   removing one or more of the tokens having the designated value between the first token and the second token; and
   padding the tokenized representation with an instance of the designated value for each removed token before the first token or after the second token.

4. The method of claim 1 wherein converting the representation of the first type to the representation of the second type comprises:
   identifying a sequence of two or more tokens having the designated value between the first token and the second token;
   removing one or more of the tokens having the designated value between first token and the second token while leaving at least one token having the designated value between the first token and the second token; and
   padding the tokenized representation with an instance of the designated value for each removed token before the first token or after the second token.

5. The method of claim 1 wherein converting the representation of the first type to the representation of the second type comprises:
   moving tokens represented by index values in the vocabulary to one of a beginning and an end of the tokenized representation; and
   moving tokens having the designated value to the other one of the beginning and the end of the tokenized representation.

6. The method of claim 1 wherein the embedding layer of the deep learning network is configured to map the tokens to the vector space such that a distance between a given vector value of a given token representing a given command in the vocabulary of known script commands and an additional vector value of an additional token representing an additional command in the vocabulary of known script commands is based on a similarity of the given command and the additional command.

7. The method of claim 1 wherein the at least one hidden layer comprises a sequence of two or more hidden layers each comprising a convolutional layer.

8. The method of claim 1 wherein the at least one hidden layer comprises a convolutional layer comprising two or more convolution filters configured to activate in response to detecting a feature in the given software script.

9. The method of claim 8 wherein the convolutional layer applies Rectified Linear Units (ReLU) activation functions to its output.

10. The method of claim 8 wherein the given hidden layer further comprises a dropout layer configured to dropout random sets of activations in the convolutional layer.

11. The method of claim 8 wherein the given hidden layer further comprises a pooling layer configured to provide non-linear down-sampling of the output of the convolutional layer.

12. The method of claim 1 wherein the one or more classification layers comprise:
- a fully connected layer comprising neurons with connections to all activations in the at least one hidden layer; and
- an output layer comprising at least one neuron that generates a representation of a confidence level of the deep neural network in classifying the given software script as the given software script type.

13. The method of claim 12 wherein the designated software script type comprises malicious software scripts.

14. The method of claim 1 wherein modifying access by the given client device to the given software script comprises at least one of:
- removing the given software script from a memory or storage of the given client device;
- preventing the given client device from obtaining the given software script; and
- causing the given software script to be opened in a sandboxed application environment on the given client device.

15. A computer program product comprising a non-transitory processor-readable storage medium having stored therein program code of one or more software programs, wherein the program code when executed by at least one processing device cause the at least one processing device:
- to generate a tokenized representation of a given software script, the tokenized representation comprising two or more tokens representing two or more commands in the given software script;
- to map the tokens of the tokenized representation to a vector space providing contextual representation of the tokens utilizing an embedding layer of a deep learning network;
- to detect sequences of the mapped tokens representing sequences of commands associated with designated types of script behavior utilizing at least one hidden layer of the deep learning network;
- to classify the given software script based on the detected sequences of the mapped tokens utilizing one or more classification layers of the deep learning network; and
- to modify access by a given client device to the given software script responsive to classifying the given software script as a given software script type;
- wherein generating the tokenized representation comprises:
  - generating an array comprising a set of ordered token values corresponding to an order of the tokens in the given software script, wherein a given one of the token values comprises either (i) an index value representing a known script command in a vocabulary of known script commands of a scripting language utilized by the given software script or (ii) a designated value representing an unknown script command not in the vocabulary of known script commands;
  - determining whether the array comprises a representation of a first type, the representation of the first type comprising at least a threshold number of consecutive instances of the designated value representing unknown script commands between a first token of the array comprising a first index value representing one of the known script commands and a second token of the array comprising a second index value representing one of the known script commands; and
  - responsive to determining that the array comprises the representation of the first type, converting the representation of the first type to a representing of a second type different than the first type by altering at least one of an ordering and a number of token values in the array having the designated value representing unknown script commands such that there is less than the threshold number of consecutive instances of the designated value representing unknown script commands between the first token and the second token.

16. The computer program product of claim 15 wherein generating the tokenized representation of the given software script comprises tokenizing the given software script into the two or more tokens based on delimiters of a scripting language utilized by the given software script.

17. The computer program product of claim 15 wherein:
- the embedding layer is configured to map the tokens to the vector space such that a distance between a given vector value of a given token representing a given command in the vocabulary of known script commands and an additional vector value of an additional token representing an additional command in the vocabulary of known script commands is based on a similarity of the given command and the additional command;
- the at least one hidden layer comprises a convolutional layer with an associated dropout layer and an associated pooling layer, the convolution layer comprising two or more convolution filters that activate in response to detecting a feature in the given software script, the dropout layer being configured to drop out random sets of activations in the associated convolutional layer, and the pooling layer being configured to provide non-linear down-sampling of the output of the convolutional layer; and
- the one or more classification layers comprise a fully connected layer comprising neurons with connections to all activations in the at least one hidden layer and an output layer comprising at least one neuron that generates a representation of a confidence level of the deep neural network in classifying the given software script as the given software script type.

18. An apparatus comprising:
- at least one processing device comprising a processor coupled to a memory;
- the at least one processing device being configured:
  - to generate a tokenized representation of a given software script, the tokenized representation comprising two or more tokens representing two or more commands in the given software script;

to map the tokens of the tokenized representation to a vector space providing contextual representation of the tokens utilizing an embedding layer of a deep learning network;

to detect sequences of the mapped tokens representing sequences of commands associated with designated types of script behavior utilizing at least one hidden layer of the deep learning network;

to classify the given software script based on the detected sequences of the mapped tokens utilizing one or more classification layers of the deep learning network; and to modify access by a given client device to the given software script responsive to classifying the given software script as a given software script type;

wherein generating the tokenized representation comprises:

generating an array comprising a set of ordered token values corresponding to an order of the tokens in the given software script, wherein a given one of the token values comprises either (i) an index value representing a known script command in a vocabulary of known script commands of a scripting language utilized by the given software script or (ii) a designated value representing an unknown script command not in the vocabulary of known script commands;

determining whether the array comprises a representation of a first type, the representation of the first type comprising at least a threshold number of consecutive instances of the designated value representing unknown script commands between a first token of the array comprising a first index value representing one of the known script commands and a second token of the array comprising a second index value representing one of the known script commands; and responsive to determining that the array comprises the representation of the first type, converting the representation of the first type to a representing of a second type different than the first type by altering at least one of an ordering and a number of token values in the array having the designated value representing unknown script commands such that there is less than the threshold number of consecutive instances of the designated value representing unknown script commands between the first token and the second token.

19. The apparatus of claim 18 wherein generating the tokenized representation of the given software script comprises tokenizing the given software script into the two or more tokens based on delimiters of a scripting language utilized by the given software script.

20. The apparatus of claim 18 wherein:

the embedding layer is configured to map the tokens to the vector space such that a distance between a given vector value of a given token representing a given command in the vocabulary of known script commands and an additional vector value of an additional token representing an additional command in the vocabulary of known script commands is based on a similarity of the given command and the additional command;

the at least one hidden layer comprises a convolutional layer with an associated dropout layer and an associated pooling layer, the convolution layer comprising two or more convolution filters that activate in response to detecting a feature in the given software script, the dropout layer being configured to drop out random sets of activations in the associated convolutional layer, and the pooling layer being configured to provide non-linear down-sampling of the output of the convolutional layer; and the one or more classification layers comprise a fully connected layer comprising neurons with connections to all activations in the at least one hidden layer and an output layer comprising at least one neuron that generates a representation of a confidence level of the deep neural network in classifying the given software script as the given software script type.

* * * * *